United States Patent Office 2,945,346
Patented July 19, 1960

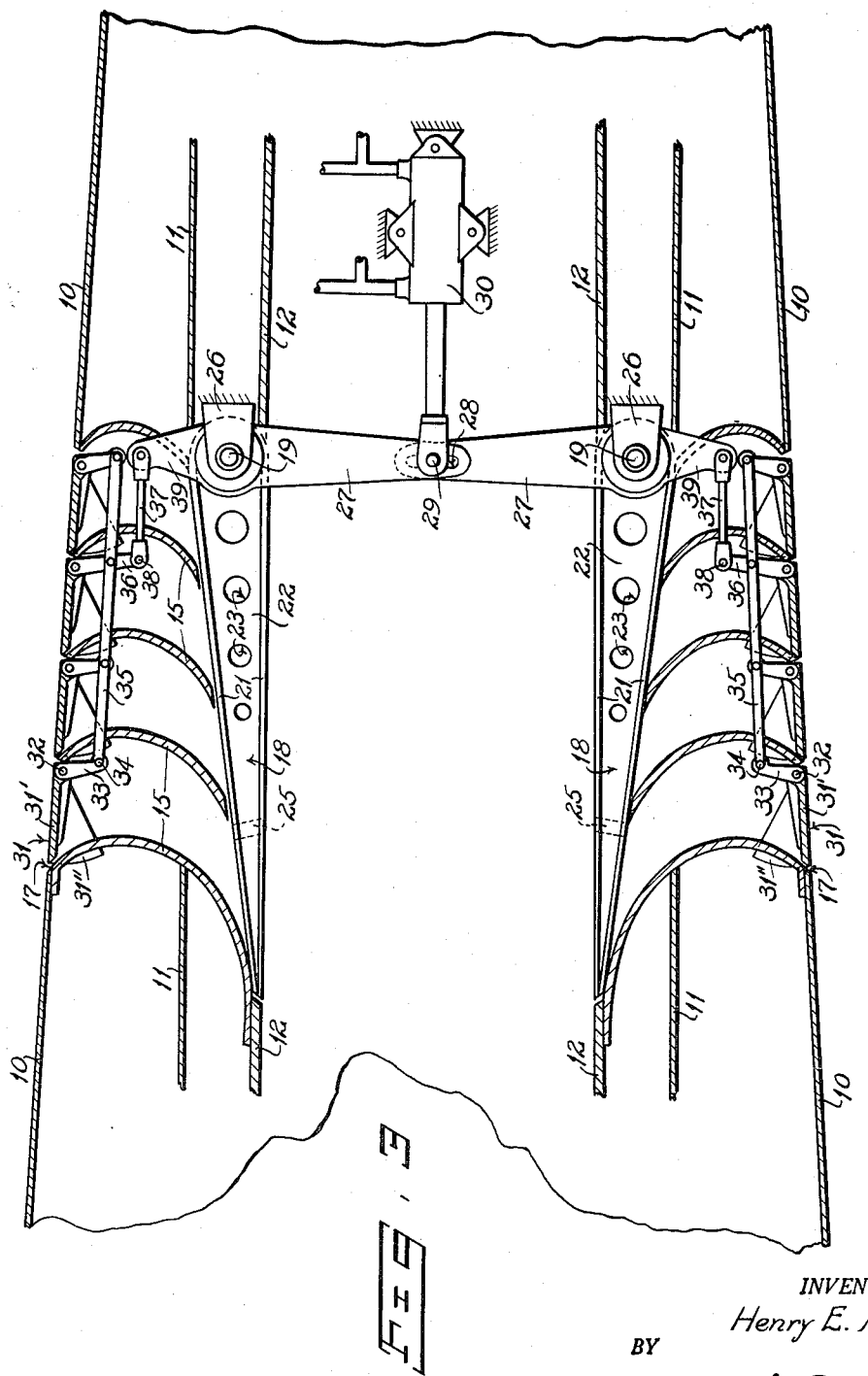

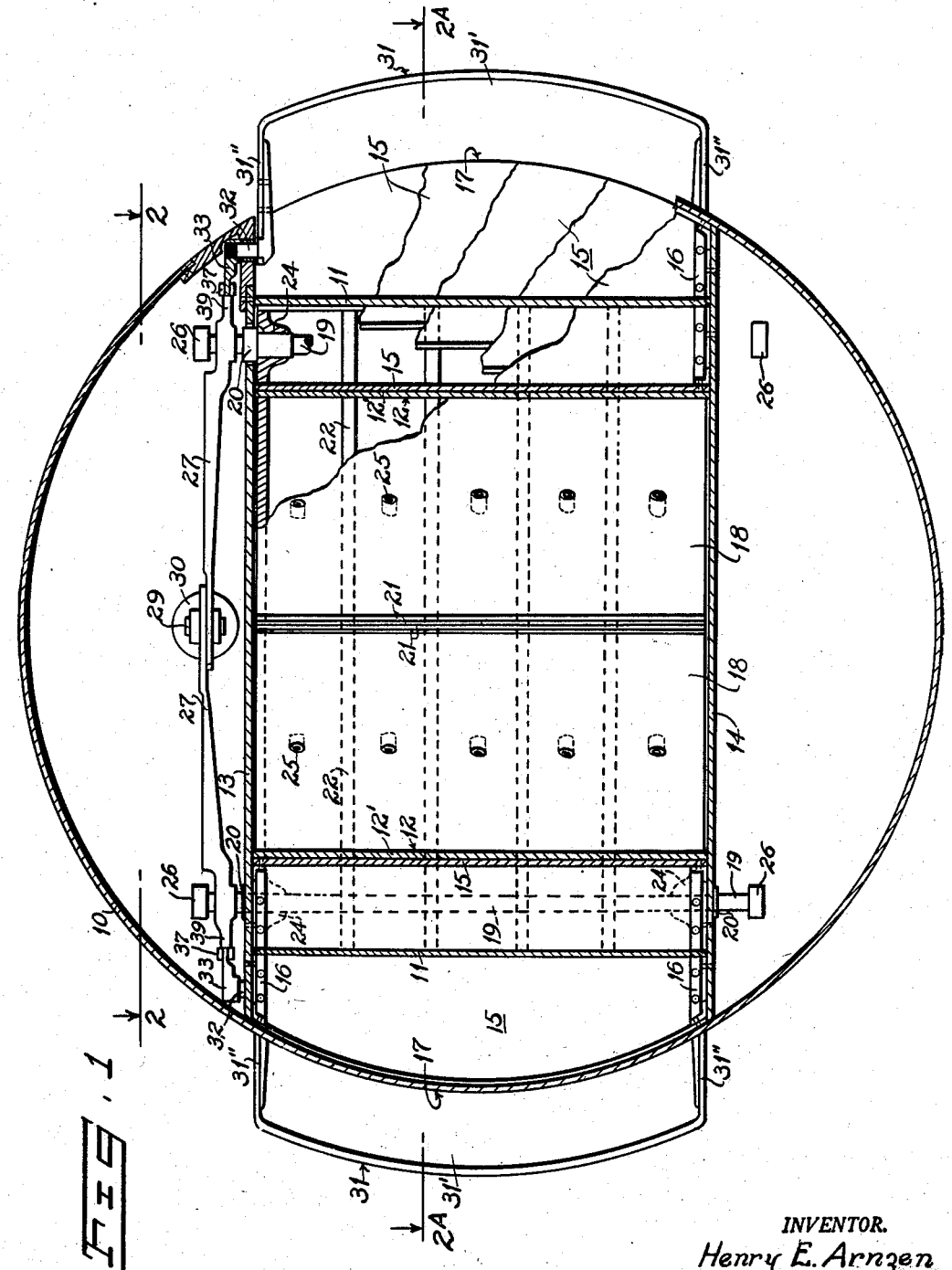

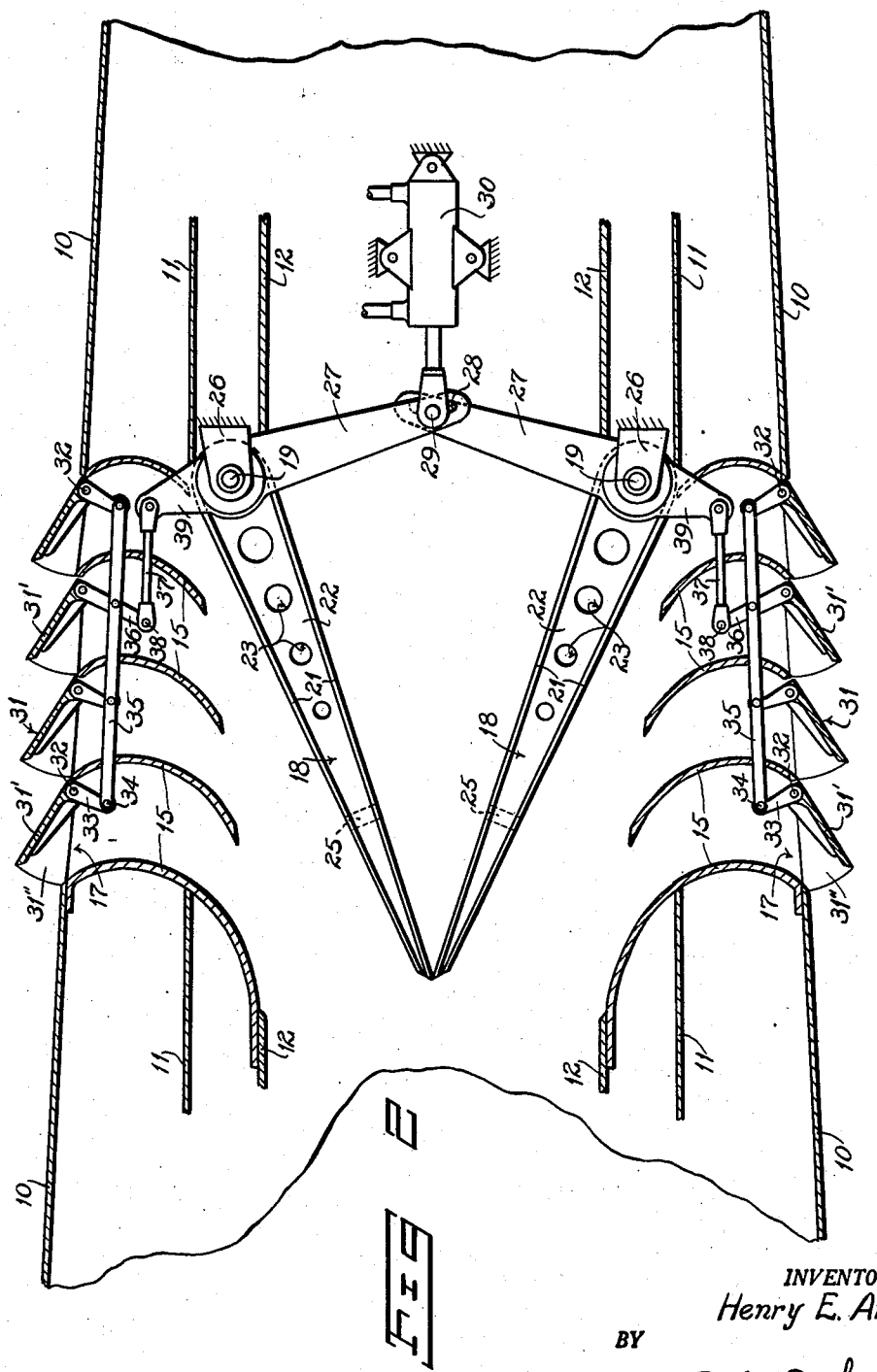

2,945,346

REVERSE THRUST BRAKE

Henry E. Arnzen, Amityville, N.Y., assignor to Republic Aviation Corporation, near Farmingdale, N.Y., a corporation of Delaware Filed Oct. 4, 1954, Ser. No. 459,886

3 Claims. (Cl. 60—35.54)

This invention relates to reverse thrust brakes for jet engines and more particularly to an improved reverse thrust mechanism, primarily designed for aircraft employing jet engines, which may be retracted completely within the aircraft during normal flight to the end that the external surface or aerodynamic contour of the aircraft will be unbroken thereby and the means by which said mechanism is operated.

The present invention, among other things, proposes a controlled, operating mechanism which may be incorporated in an aircraft to so direct the exhaust gases from the engine thereof that both forward and backward or reverse thrust of the aircraft may be effected.

At the same time the instant invention contemplates means whereby the mechanism may be retracted totally within an aircraft during the normal forward propulsive operation of the aircraft lest it adversely affect forward speed or create drag. Moreover, when so retracted, it forms an unbroken continuation of the internal walls defining the passage or duct through which the exhaust gases pass during normal flight of the aircraft.

With the above and other objects in view, as will be apparent, this invention consists in the construction, combination and arrangement of parts all as hereinafter more fully described, claimed and illustrated in the accompanying drawings, wherein:

Fig. 1 is a transverse section taken through a housing, e.g., a nacelle, fuselage, etc., which encloses the exhaust passage or duct of a jet engine to show the present reverse thrust brake disposed therein in its operative position with various portions thereof broken away to show the means by which the brake is actuated to and from this position;

Fig. 2 is a section taken partially along line 2—2 and partially along line 2A—2A of Fig. 1 with the associated wall of the exhaust duct removed to show in full lines the entire actuating mechanism for operation of the instant reverse thrust brake; and Fig. 3 is a view like Fig. 2 to show the present brake disposed in its inoperative position.

Reverse thrust mechanisms per se are admittedly old in the art. These devices, however, have, without exception, been ineffectual in their intended purpose and have not been adopted with any appreciable success for one reason and another. The most common objection to the best of these prior mechanisms is that they are unduly complex and, therefore, prone to fail in an emergency or even in extended normal service and/or they are cumbersome, bulky and undesirably heavy. These shortcomings of existing reverse thrust devices are especially intolerable in aircraft where weight and internal space available for such equipment is at a premium.

Additionally, reverse thrust devices heretofore proposed have proven unsatisfactory and, therefore have been rejected because all of these devices either project from the aircraft into, so as to break or interrupt, the aerodynamic contour thereof or project internally of the aircraft into the exhaust passage. In either case they adversely affect the operation of the aircraft during normal flight, i.e. in the first instance they create drag or resistance to forward propulsion and in the second instance they reduce the thrust or propulsive force developed by the engine.

It is the purpose of the present invention to overcome the foregoing as well as other objections. To that end a pilot-controlled mechanism is proposed for reversing the direction of thrust developed by the jet engine of an aircraft which, when not in actual operation, may be retracted completely within the airframe whereby smooth and continuous internal, as well as external, surfaces are formed. Thus, during normal flight of the aircraft, when the present reverse thrust mechanism is inoperative, it imposes no parasite load on the aircraft either in the form of drag or in a reduction of thrust produced by the engine.

With the instant reverse thrust mechanism, landing of the aircraft can be accomplished on a landing strip or runway of minimum length, since the distance required for deceleration, i.e. bringing the aircraft to a stop upon landing, is materially reduced. This has become, and will continue to be, of major importance due to the ever-increasing speed of aircraft with a concurrent increase in landing or touch-down speed. Surface controls or flaps and brakes alone have proven to be totally incapable of safely stopping present-day high speed aircraft after touch-down on existing runways or even on runways which have been reasonably extended.

Additionally, in multi-engine airplanes the present mechanism particularly lends itself for navigation or short radius steering both on ground and on water. Thus, a positive or forward thrust of the engine or engines operative on one side of the aircraft and a negative or reverse thrust on the engines operative on the opposed side will effect the sharpest possible turning of the aircraft.

It is also possible, by means of this invention, to control air speed and flight operations of the aircraft generally. Not only is such control advantageous in reducing the speed or braking the aircraft prior to landing, but it also permits steeper diving attitudes for accuracy in dive-bombing, strafing, etc. particularly important with respect to fighter aircraft.

Referring more particularly now to the drawings, 10 designates a fragmentary portion of a jet engine housing or nacelle adjacent the area thereof in which it is desired to locate the present mechanism. An extension 11 of the shroud in which the associated jet engine (not shown) is contained passes through this area of the housing 10. The jet engine is provided with, and terminates in, a tail pipe 12 which is disposed substantially centrally within the shroud 11 for the passage of exhaust gases from the engine.

Diametrically opposed portions of the tail pipe 12 are removed throughout the length of this area of the housing 10 in which the present mechanism is located and the remaining opposed portions of the pipe 12 therebetween are flattened out to create a pair of parallelly disposed side walls 12'. Aft of this area each of these walls 12' reconverge into a continuation of the tail pipe 12 as it exists forward of the removed portions just described.

The opposite open portions of the tail pipe 12 thus created are closed by a pair of opposed flat walls 13 and 14 respectively whereby a substantially rectangular cross-section is formed. Each of the walls 13 and 14 extends transversely of the housing 10 to abut the opposed inner walls thereof. A plurality of vanes or louvers 15 are each fixedly secured to the outer corresponding ends of the walls 13 and 14, to be disposed in and transversely fill and close, the space defined by the outer wall of the exhaust pipe 12 and the inner wall or skin of the housing 10. To this end an angle bracket 16 is riveted, or otherwise secured, at the ends of each louver 15 and to the associated inner face of the walls 13 and 14. Each of these angles 16 extends along the entire width of its associated louver 15 whereby each louver is rigidly secured so as to become, in effect, an integral part of the walls 13 and 14.

The skin or wall of the housing 10 between each group of louvers 15 on opposed sides of the housing 10 is cut away, as at 17. The shroud 11 is interrupted in its length between the first and last louver 15 of each opposed group whereby the internal passage in exhaust pipe 12 is in open communication with the outside of the housing 10.

A pair of identical gates or doors 18 are each pivotally mounted on corresponding outer ends of the walls 13 and 14 on a shaft 19 which extends between, and pierces, the walls 13 and 14 in which it is rotatably mounted in any common and well-known manner such as, for example, by means of a bearing 20. The shafts 19 are identical one with the other and symmetrically disposed about the longitudinal axis of the housing 10 in a common transverse plane whereby the free or outer ends of the gates 18 abut in the longitudinal center of the exhaust pipe 12 upon the rotation thereof.

Each door 18 is generally triangular or wedge-shaped in cross-section being secured, or splined, to its respective shaft 19 adjacent the base thereof with its apex designed to terminate at the longitudinal centerline of the housing 10. By way of example each door 18 may consist of a pair of substantially rectangular plates or sheets 21 conforming in shape, when disposed with their outer or free ends in abutment (Fig. 1), to the cross-sectional area of the exhaust pipe 12 defined by the side walls 12', 13 and 14. These sheets 21 are secured one to the other by means of and through a plurality of transverse ribs 22 which are riveted or otherwise fastened to the associated faces of the sheets. If desired, a number of lightening holes 23 may be provided in each of the ribs 22 and that portion of any or all of the ribs 22 through which the shafts 19 pass may be enlarged, as at 24, to form an inregral socket for structural purposes.

Moreover, each door 18 may, if desired or required, be provided with a plurality of relatively small apertures 25 to vent or bleed a predetermined quantity of the gases passing through the exhaust pipe 12 for reasons which will become more apparent upon subsequent disclosure of the operation of the invention.

At its opposite ends each shaft 19 is pivotally secured in a bearing 26 which is appropriately secured to, so as to become, in effect, an immovable part of, stationary structure internally of the housing 10 in any suitable and well-known manner. Thus, upon rotation of the shafts 19, the doors 18 are concurrently rotated internally of the exhaust pipe 12 to a position where the free ends thereof abut in the longitudinal center of the exhaust pipe 12. With the doors 18 so disposed, the exhaust pipe 12 is completely closed and gases from the engine, located forwardly thereof, are directed or deflected to pass out of the housing 10 through the openings 17 between the fixed vanes or louvers 15 (Fig. 2).

Rotation of the shafts 19 in the opposite direction, however, serves to concurrently move the doors 18 outwardly of the exhaust pipe 12 to a position where the outer faces thereof abut the inner ends of the louvers 15. At the same time the inner face or wall of each door 18 forms a continuation of the inner surfaces of the side walls 12' of the exhaust pipe 12 whereby the gases from the engine are allowed to pass without restriction through the entire length of the exhaust pipe 12 (Fig. 3).

To the end that the shafts 19 may be rotated, or driven, in the foregoing manner, corresponding ends of these shafts 19 are each splined or keyed to an operating lever 27. The opposite or free ends of the operating levers 27 terminate in overlapping association one with the other in the plane of the longitudinal center of the housing 10. These associated ends of the levers 27 are each provided with an elongated slot 28 to receive a pin or bolt 29 by which the levers are connected one to the other and to the piston rod or driving arm of a power unit 30.

The power unit 30 is fixedly mounted to stationary structure forming an integral part of the housing 10 in any suitable and well-known manner, and is provided with conventional fittings whereby inlet and outlet lines may be connected thereto for its operation. The means per se by which the power unit 30 is extended and retracted, forms no part of the present invention, as any standard or existing device may be employed. However, the invention contemplates that the control lever or switch by which the power unit 30 is actuated be located in the cockpit or cab of the vehicle employing the jet engine for the convenient handling thereof by the pilot or operator.

From the foregoing it is apparent that when the operator actuates the power unit 30 for the extension thereof, the shafts 19 are rotated in unison to drive their respective doors 18 outwardly of the exhaust pipe 12 whereby said pipe is opened for the free and unrestricted passage of exhaust gases therethrough (Fig. 3). This corresponds to normal flight operation of the aircraft where the engine is supplying forward or positive thrust. Conversely, when the power unit 30 is retracted, the doors 18 are concurrently rotated inwardly of the exhaust pipe 12 to close said pipe (Fig. 2). Thus exhaust gases from the engine are directed outwardly of the housing 10 through the fixed louvers 15. This corresponds to the operative position of the present mechanism whereby the jet engine produces a reverse or negative thrust.

In order to effectively close the openings 17 in the skin of the housing 10, and thereby reduce drag on the aircraft, when the present mechanism is disposed in its inoperative position, a plurality of auxiliary doors 31 are provided, one being disposed between each pair of adjacent louvers 15. These auxiliary doors 31 also serve as nozzles or extension louvers to augment the effective thrust of exhaust gases passing therethrough when the mechanism is disposed in its operative position.

To this end each auxiliary door 31 comprises an arcuate plate 31' conforming in shape and area to each of the openings 17 in the skin of housing 10. At each of its ends the plate 31' terminates in an integral flange 31" which is generally triangular or pie-shaped. A stud shaft 32 is secured to and pierces each flange 31" on corresponding ends of the doors 31 adjacent the apex end of said flange and extends from its respective door 31 in the direction of the wall 13 which it also pierces. These ends of the shafts 32 are each provided with a horn or lever 33 which is fixedly secured thereto. The opposite end of each of the horns 33 is pivotally attached by means of a bolt or pin 34 to an inter-connecting rod 35 for the operation of all of the several shafts 32 in unison.

One or more of these horns 33 are provided with an extension 36, the outer end of which is pivotally secured to a driving link 37 by a pin 38. At its other end, the link 37 is similarly connected to the outer end of an extension arm 39 integrally projecting from, so as to be diametrically opposed to, the associated operating lever 27. Thus, rotation of the levers 27, by means of and through the operation of the power unit 30 as above described, serves to actuate the several auxiliary doors 31 in unison with, and corresponding to, movement of the main doors 18 as hereinabove described.

It is, therefore, apparent that, when the main doors 18 are operated to open the exhaust pipe 12 for the free and unrestricted passage of gases therethrough, the auxiliary doors 31 are concurrently actuated by means of, and through, the mechanism just described to completely close the openings 17 in the skin of the housing 10. In this position the outer surfaces of the several doors 31 form a continuation of the outer surface of the housing 10.

Conversely, when the main doors 18 are operated to close the exhaust pipe 12 and deflect exhaust gases out of the housing 10 through the louvers 15, the auxiliary doors 31 are concurrently actuated to a position where they project outwardly of the housing 10. In this position the inner and outer surfaces of the several doors 31 form a continuation of the corresponding surfaces of their respective louvers 15 and thereby serve as nozzles to direct the outward jet of the gases.

When the main doors 18 are thus positioned, i.e. close the exhaust pipe 12, the apertures 25 therein permit a relatively small leakage of gas therethrough. This serves to prevent a suction in the exhaust pipe 12 immediately aft of the doors 18 which could conceivably draw or suck the doors beyond their intended limit of movement whereby they might become distorted and inoperative.

In the event that the power unit 30 operative on the shafts 19 at one end thereof is insufficient to activate main doors 18 and auxiliary doors 31 in the foregoing manner, supplemental power may be obtained by a duplicate actuating mechanism operative on the shafts 19 at the other end thereof. Such a mechanism would include a power unit 30, operating levers 27, extension arms 39, driving links 37, interconnecting rods 35, horns 33 and studs 32 all organized and arranged for operations as hereinabove described.

What is claimed is:

1. In an aircraft the combination with a component thereof having a jet engine therein terminating in an exhaust pipe for the discharge of gases produced by said engine at the aft end of said exhaust pipe whereby forward thrust of the aircraft is obtained, of a pair of outlet assemblies disposed between said exhaust pipe and the wall of said component one in each opposed corresponding side wall thereof for the discharge of gases from the engine therethrough and out of said component in substantial opposition to the discharge end of said exhaust pipe whereby reverse thrust of the aircraft is obtained, a movable door disposed in the exhaust pipe and operable from the exterior thereof in one direction to open said exhaust pipe for the unrestricted passage of gases therethrough and simultaneously close said outlet assemblies in unison and in the other direction to effect the reverse operation, an extensible nozzle individual to each outlet assembly and operative concurrently with said door to protract and retract said outlet assemblies relative to the component upon the opening and closing respectively of said outlet assemblies, and a plurality of vents in said door to permit the passage therethrough of a predetermined quantity of gases from the engine when said door is closed as aforesaid.

2. In an aircraft the combination with a component thereof having a jet engine therein terminating in an exhaust pipe for the discharge of gases produced by said engine at the aft end of said exhaust pipe whereby forward thrust of the aircraft is obtained, of an outlet assembly disposed between and opening in the opposed corresponding walls of said exhaust pipe and said component for the discharge of gases from said engine therethrough and out of said component in opposition to the discharge end of said exhaust pipe whereby reverse thrust of the aircraft is obtained, a pair of movable doors disposed in the exhaust pipe adjacent the openings of said outlet assemblies therein, a pilot-controlled linkage system for moving said doors in unison to and from positions where they fill and close the associated openings in the exhaust pipe and where they extend transversely across so as to fill and close said exhaust pipe aft of said openings therein, an extensible nozzle assembly individual to and associated with each said opening in the side wall of the component, a connection between said linkage system and each of said nozzle assemblies for the protraction and retraction respectively of said nozzle assemblies in unison relative to the component upon the operation of the linkage system as aforesaid, and at least one vent in each of said doors to permit the escape therethrough of a predetermined quantity of the gases from the engine when said doors are positioned transversely of the exhaust pipe.

3. In an aircraft the combination with a component thereof having a jet engine therein terminating in an exhaust pipe for the discharge of gases produced by said engine at the aft end of said exhaust pipe whereby forward thrust of the aircraft is obtained, of an outlet assembly disposed between said exhaust pipe and the wall of said component for the discharge of gases from the engine therethrough and out of said component in substantial opposition to the discharge end of said exhaust pipe whereby reverse thrust of the aircraft is obtained, closure means disposed in the exhaust pipe and operable in one direction to open said exhaust pipe for the unrestricted passage of gases therethrough and simultaneously close said outlet assembly and in the other direction to effect the reverse operation, an extensible nozzle connected to the outlet assembly and operative concurrently with the opening and closing of said door to protract and retract said outlet assembly relative to the component, and vents in said door to permit the passage therethrough of some of the gases from the engine when said door is closed as aforesaid.

References Cited in the file of this patent

UNITED STATES PATENTS

| 340,237 | Nagel et al. | April 20, 1886 |
| 1,415,705 | Rees | May 9, 1922 |
| 2,510,506 | Lindhagen et al. | June 6, 1950 |
| 2,637,164 | Robson et al. | May 5, 1953 |
| 2,681,548 | Kappus | June 22, 1954 |
| 2,802,333 | Price et al. | Aug. 13, 1957 |

FOREIGN PATENTS

| 860,754 | Germany | Dec. 22, 1952 |